Feb. 6, 1934.  S. W. SPARKS  1,946,117
METHOD OF AND APPARATUS FOR EXTRUDING VALVES AND MULTIFLANGED PIPE FITTINGS
Filed Nov. 18, 1929  8 Sheets-Sheet 1
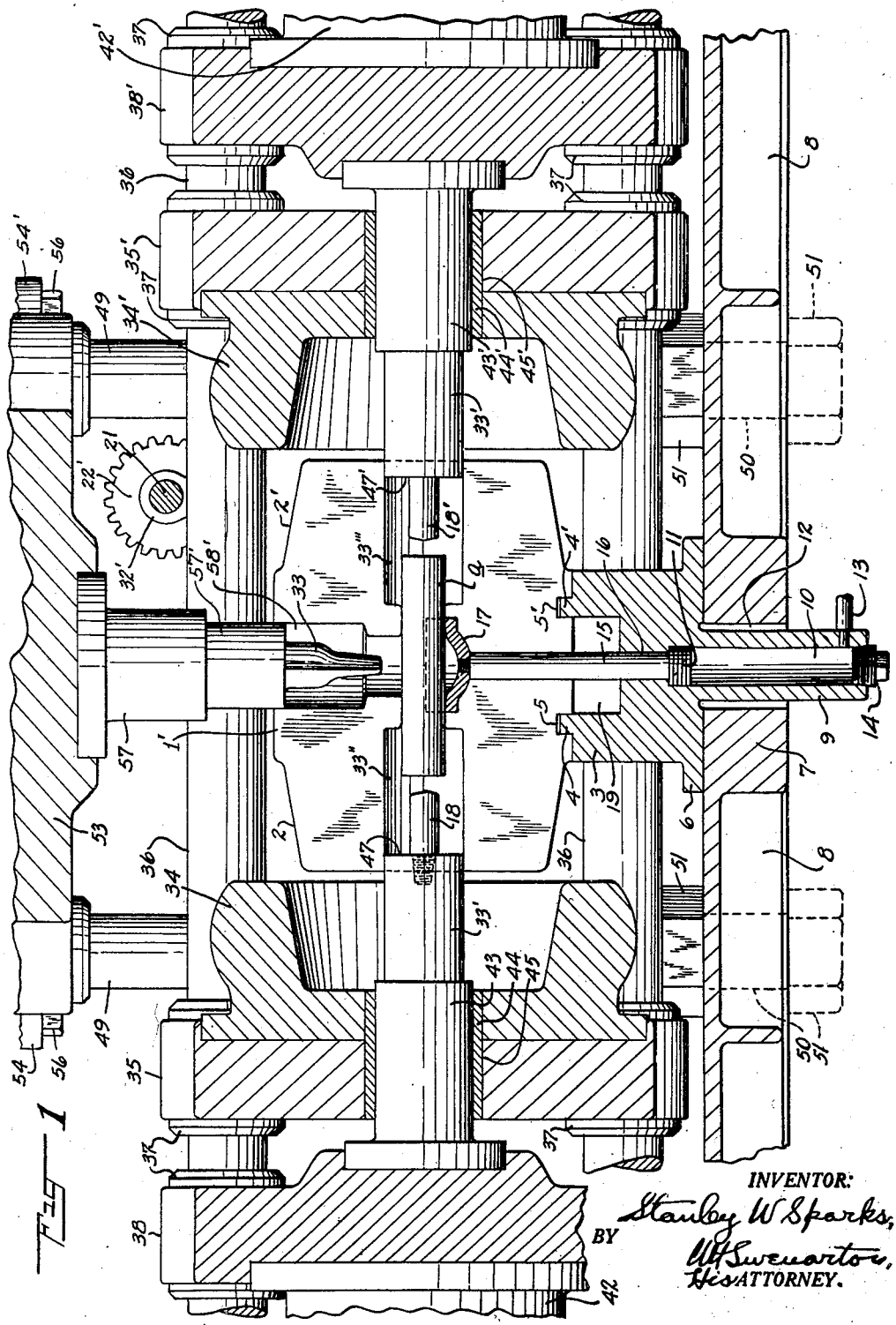
INVENTOR:
Stanley W. Sparks,
BY
His ATTORNEY.

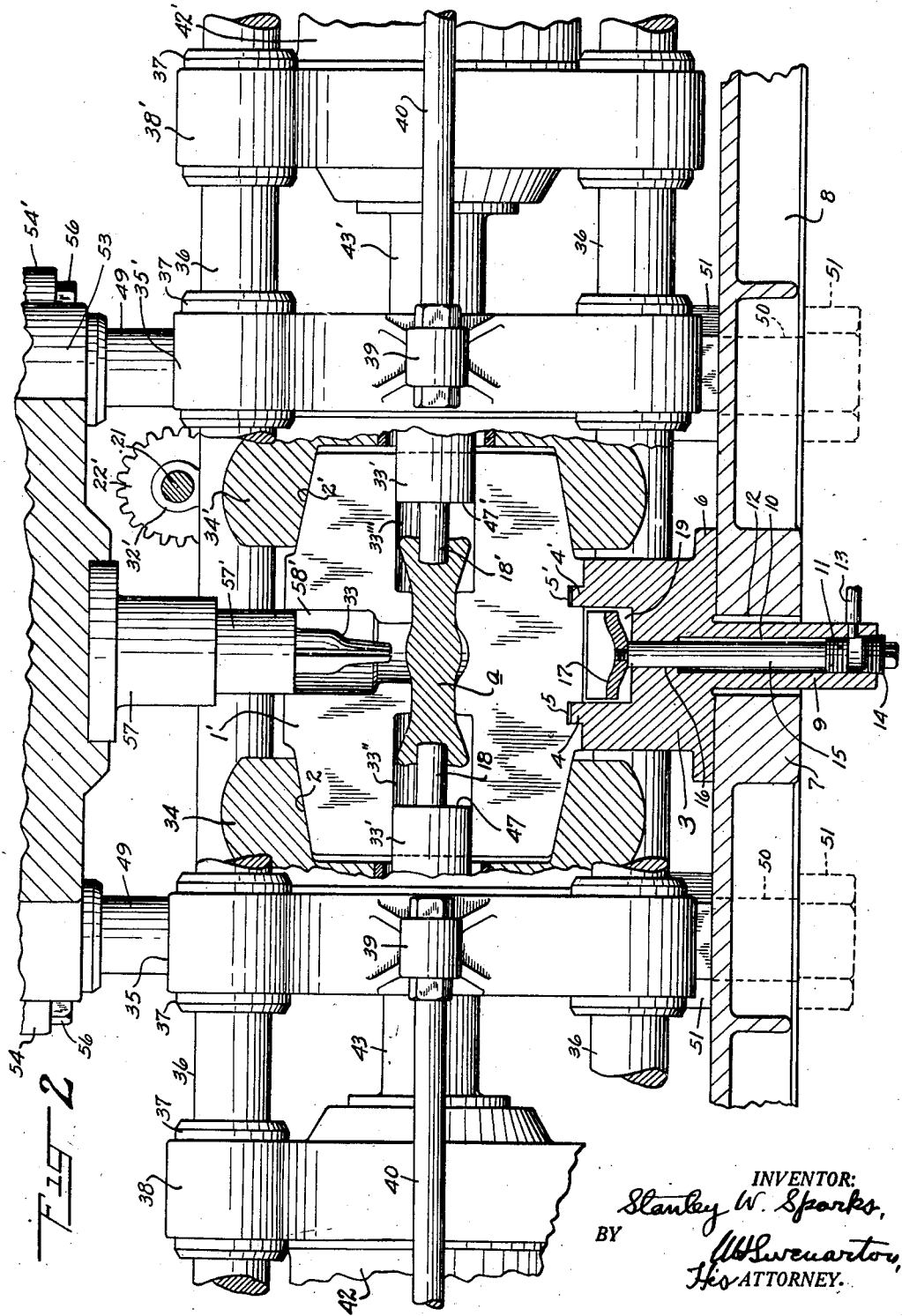

Feb. 6, 1934.  S. W. SPARKS  1,946,117
METHOD OF AND APPARATUS FOR EXTRUDING VALVES AND MULTIFLANGED PIPE FITTINGS
Filed Nov. 18, 1929  8 Sheets-Sheet 3
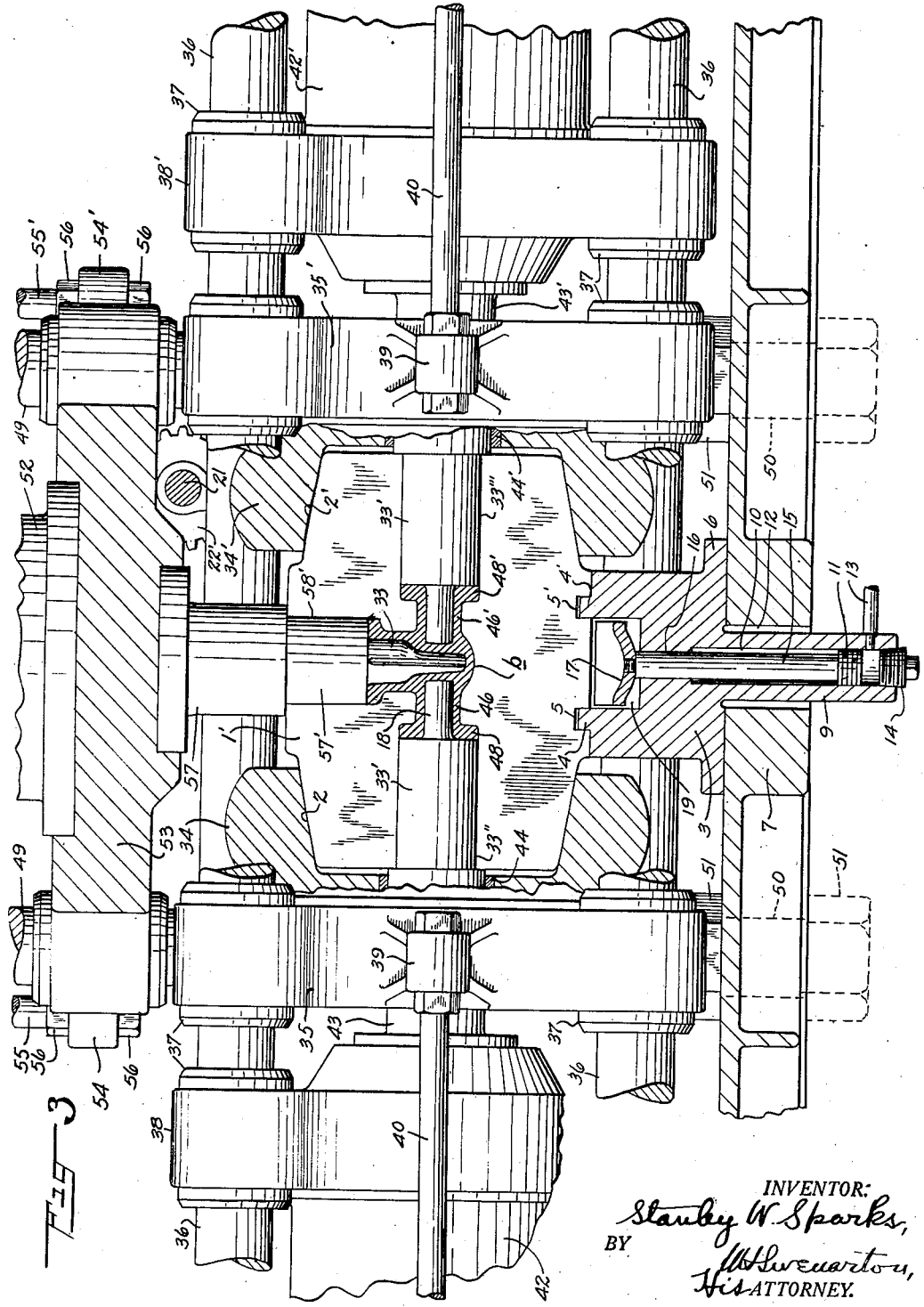
INVENTOR:
Stanley W. Sparks,
BY
His ATTORNEY.

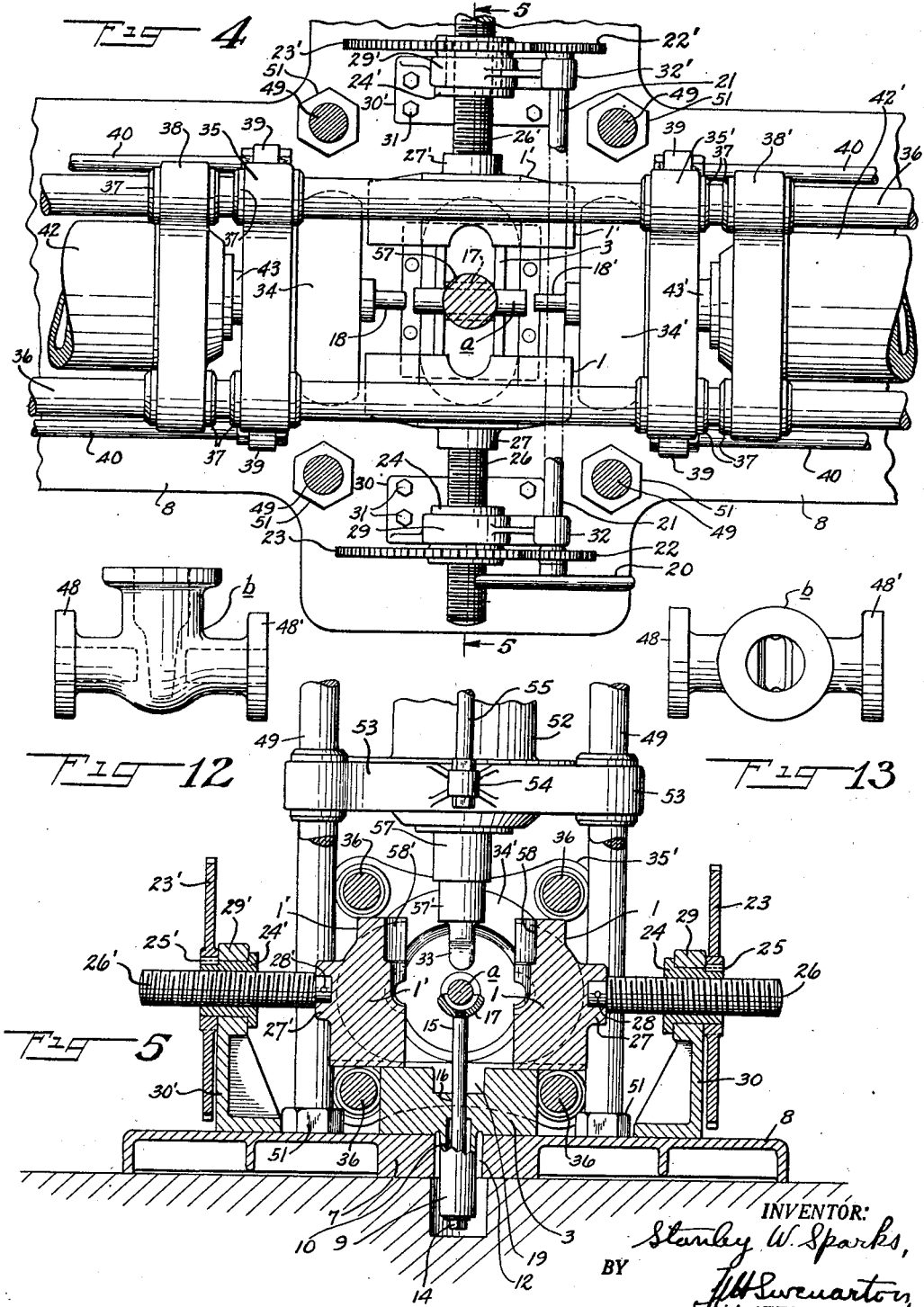

Feb. 6, 1934.    S. W. SPARKS    1,946,117
METHOD OF AND APPARATUS FOR EXTRUDING VALVES AND MULTIFLANGED PIPE FITTINGS
Filed Nov. 18, 1929    8 Sheets-Sheet 5

INVENTOR:
Stanley W. Sparks,
BY
His ATTORNEY.

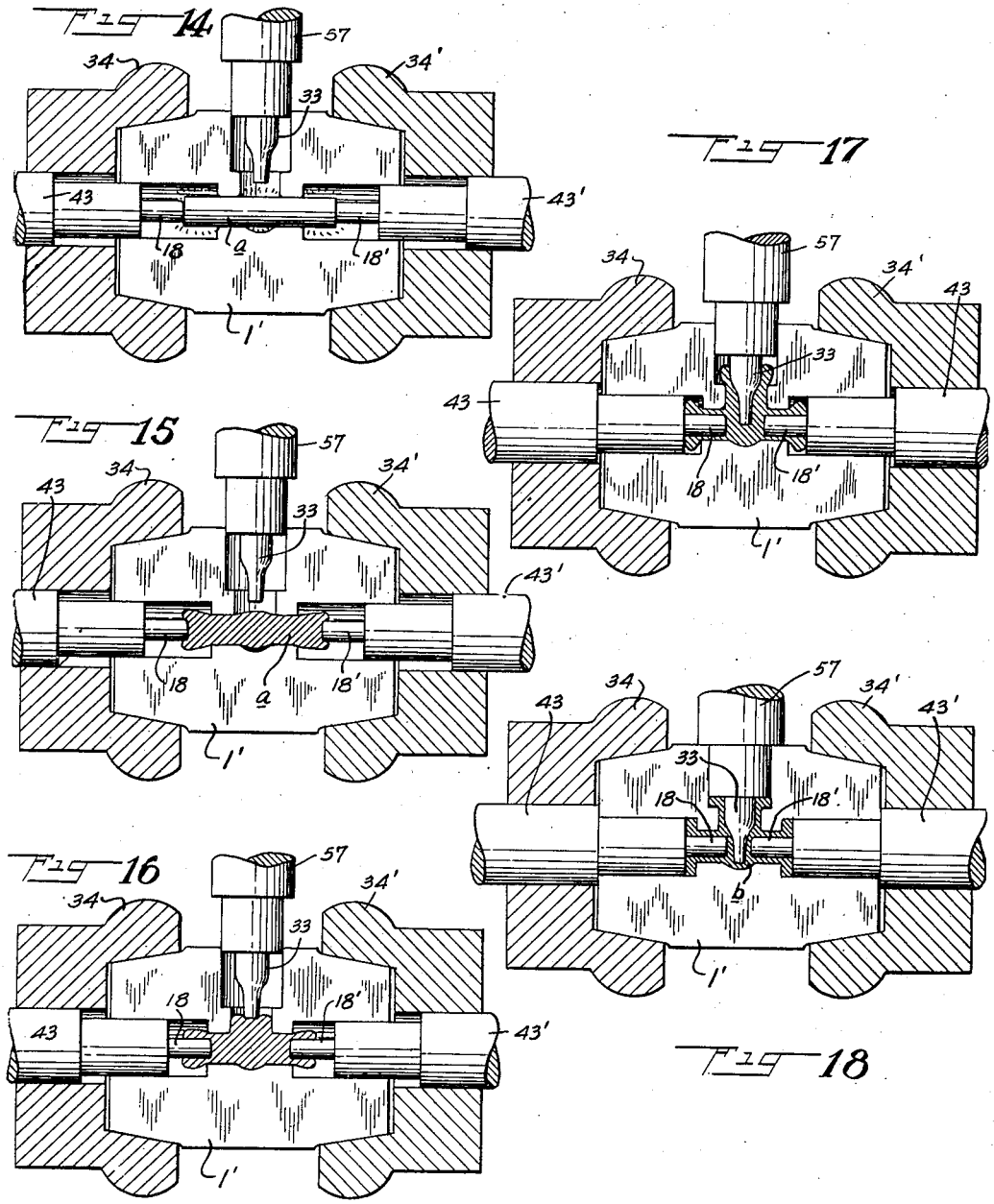

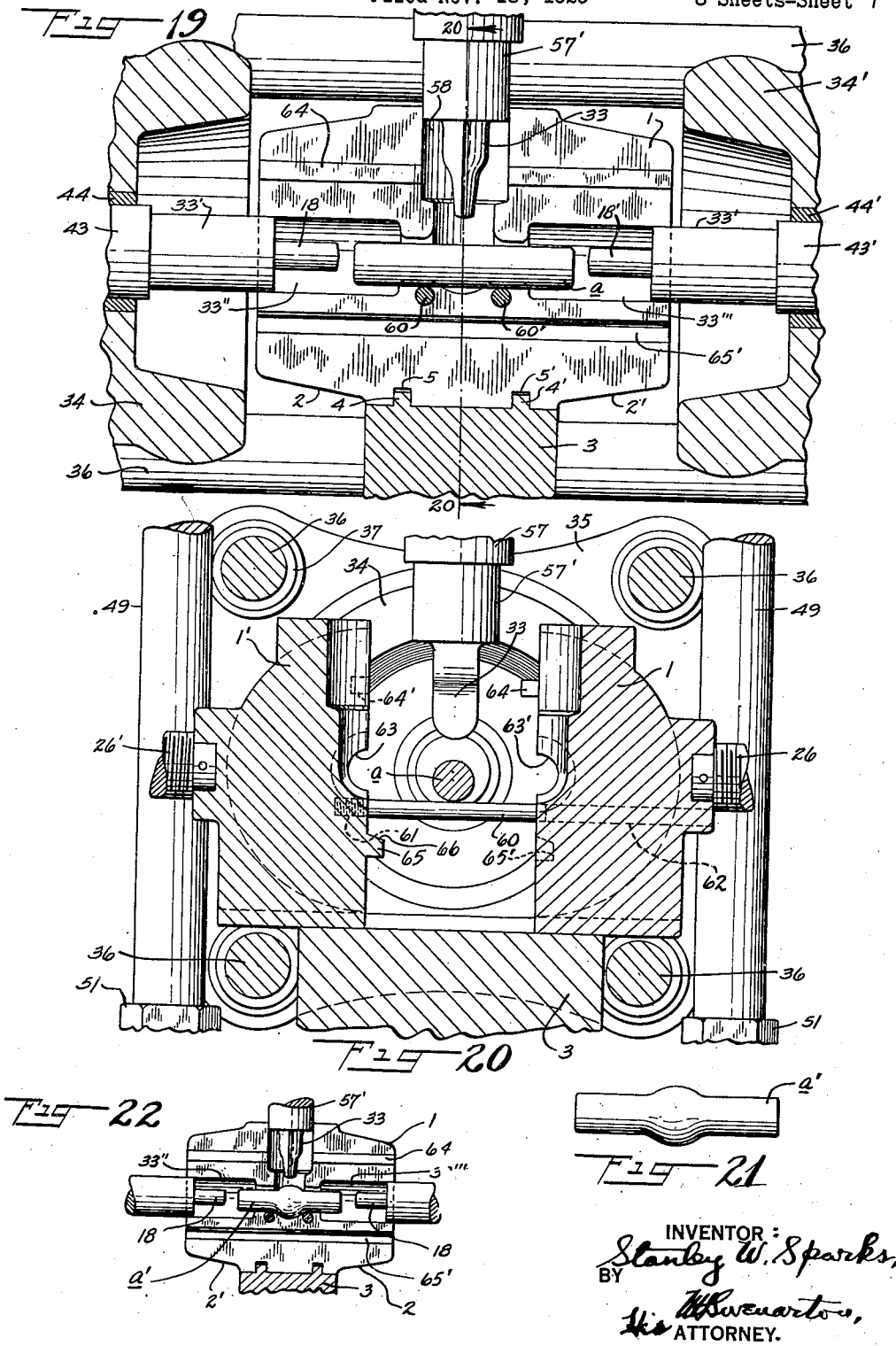

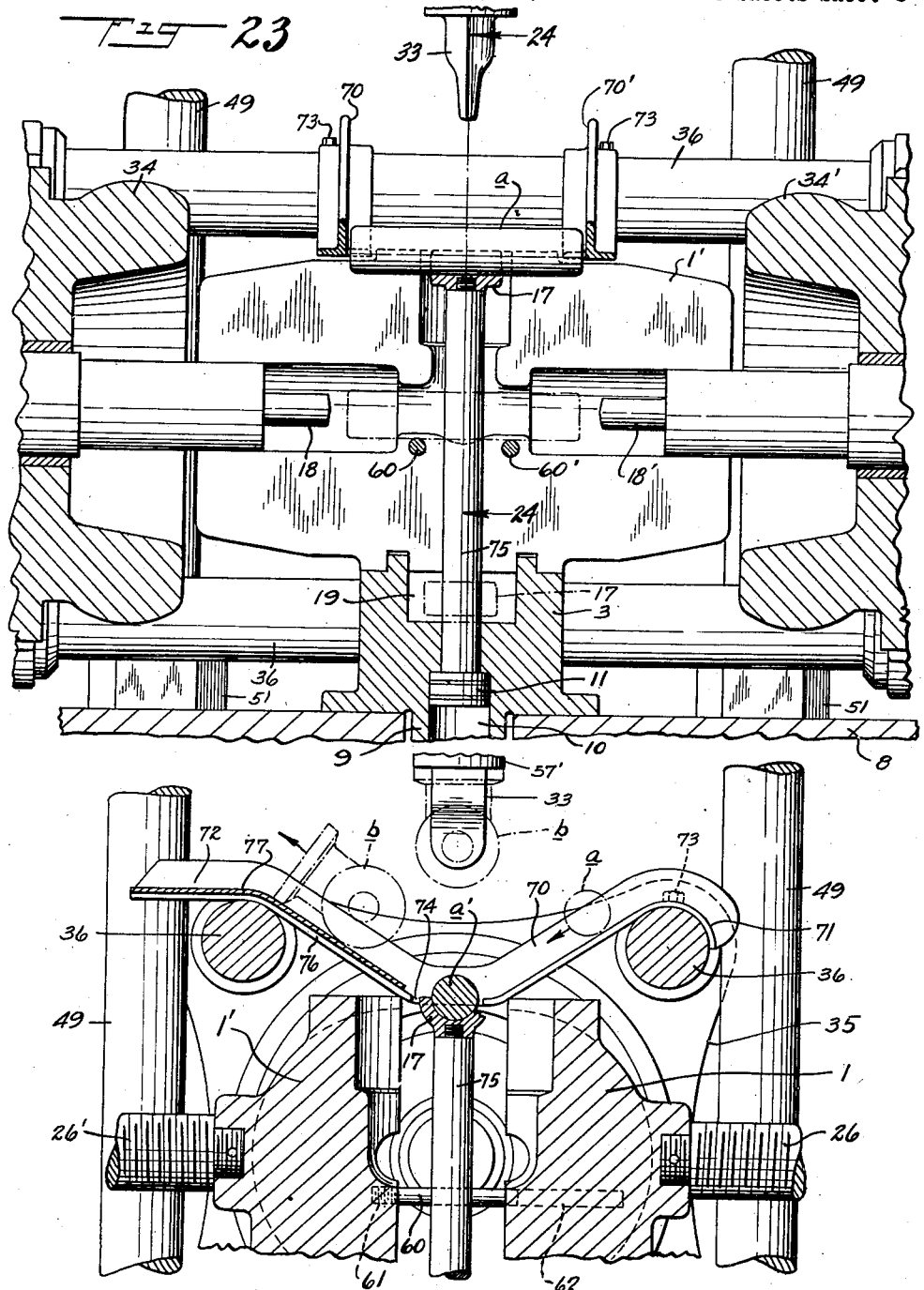

Patented Feb. 6, 1934

1,946,117

UNITED STATES PATENT OFFICE 1,946,117

METHOD OF AND APPARATUS FOR EXTRUDING VALVES AND MULTIFLANGED PIPE FITTINGS

Stanley W. Sparks, New York, N. Y., assignor to Charles H. Bickell, trustee, New York, N. Y.

Application November 18, 1929
Serial No. 407,936

8 Claims. (Cl. 78—81)

This invention relates to the method of rapid production by extrusion of valves and multi-flanged pipe fittings of either ferrous metal or non-ferrous metals, wherein all of the outside and a major portion of the inside shape of the same are produced by a single cycle of operations upon a solid heated metal blank having the same cubical content and weight as the finished valve or fitting.

In the commercial production of forged steel valves and pipe connections by the employment of steam or drop-hammers or hydraulic presses, the outside shape of these articles are formed from a solid billet, by a series of operations, into a solid drop forging requiring later expensive inside machine-finishing operations which greatly add to the cost of the forgings thus making such valves and fittings higher in cost than valves or pipe connections made of cast steel. Furthermore such forged valves and pipe connections are heavier than necessary due to the difficulty of performing complete machine operations on the inside of valve chamber and also on the fluid-ways of both valves and pipe fittings.

The particular objects of my invention are the economic and high speed production of the aforesaid valve bodies and multi-flanged pipe connections which are unusually light in weight, strong, durable and capable of replacing many cast valves and pipe connections which at present can only be formed by casting in sand molds that are eventually destroyed in recovering the finished castings therefrom.

One of the essential principles of my invention is speed of operation whereby the plasticity of the heated metal blank can be effectively utilized in conjunction with progressively increased extrusion ram pressures applied to the blank to cause the metal in the dies to have a uniform and rapid speed of flow therein during the forming of the finished shape, together with the almost instantaneous recovery of the finished forging from the die, which speed of operation prevents excessive heating of the die and consequent deterioration of same and likewise insures the flow of the metal into all the cavities of the dies along definitely determined flow-lines both during the time when the initial pressures are being applied and during the subsequent period when the metal cools off by its contact with the rams and die cavities (both of which are preferably water cooled) and during which later period increased pressures are applied to effect the final squeeze of the metal into the finished inside and outside shape and at the same time form the flanges on the hubs and body sections. Also since the flanges are formed during the latter part of the forging operation by means of an upsetting operation, it is possible to obtain the unobstructed flow of the metal into the main body shape as well as the upward flow of the more plastic metal into the upper cavities of the die before the body flange is formed.

My invention is more fully set forth and described in the following detailed description and drawings forming a part thereof, in which I have illustrated, as a preferred embodiment of my invention, an apparatus for making of valve bodies and multi-flanged pipe connections.

Referring to the drawings:

Figure 1 is a longitudinal vertical section of an apparatus suitable for the production of valve bodies and multi-flanged pipe connections in accordance with my invention, the split-dies thereof being shown in open position and the blank in position ready to be processed;

Figure 2 is a similar view of the same parts at the beginning of the extrusion operation, the split-die being shown in a closed position and being wedged together by the wedging rings;

Figure 3 is a similar view of the same parts at the last stage of the extrusion operation, after the extrusion rams have reached the end of their respective strokes, the finished shape being shown in vertical section;

Figure 4 is a plan view of such apparatus;

Figure 5 is a vertical cross section on the line 5—5 of Fig. 4;

Figure 12 is a longitudinal front elevation and Fig. 13 is a plan view of the finished valve body which is also shown in vertical section in Fig. 3;

Figures 14 to 18 are diagrams showing the position of the parts at progressive stages of the operation;

Figure 19 is a longitudinal vertical section, similar to Fig. 1, but showing a modified form of billet-supporting means.

Figure 20 is a section on line 20—20 of Fig. 19;

Figure 21 is a side elevation of pre-formed billet;

Figure 22 is a fragmentary, longitudinal vertical section, similar to Fig. 19, but showing a pre-formed billet therein;

Figure 23 is a longitudinal vertical section, similar to Fig. 1, but showing another form of billet-supporting means;

Figure 24 is a section on line 24—24 of Fig. 23.

Figure 6:
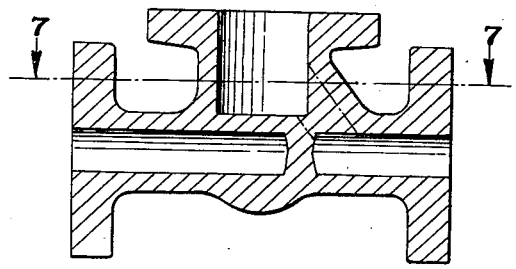
Figure 6 is a longitudinal vertical center section of a flanged globe valve body.
Figure 7:
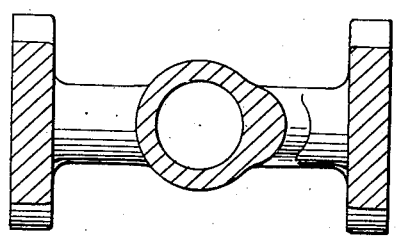
Figure 7 is a section of same on the line 7—7 of Fig. 6.
Figure 8:
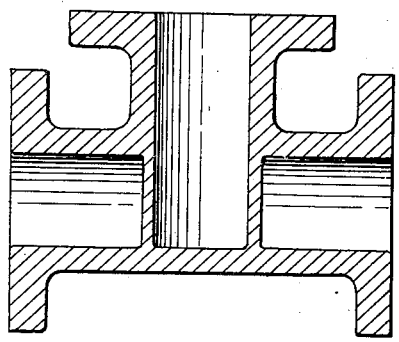
Figure 8 is a longitudinal vertical center section of a multi-flanged pipe T.
Figure 9:
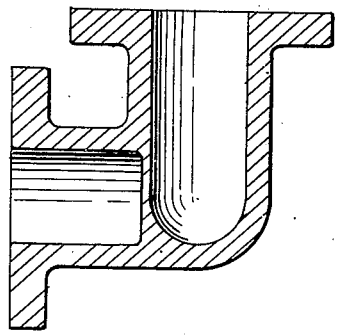
Figure 9 is a longitudinal vertical center section of a multi-flanged pipe L.
Figure 10:
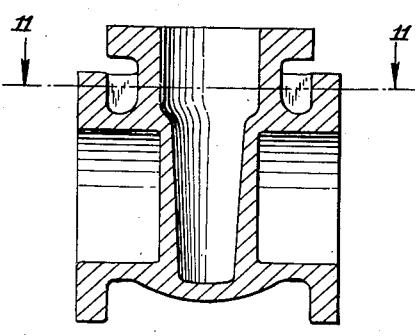
Figure 10 is a longitudinal vertical center section of a standard gate-valve body.
Figure 11:
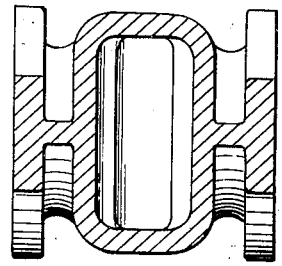
Figure 11 is a section on line 11—11 of Fig. 10.

Referring to Figs. 1 to 5 of the drawings and the construction shown therein, the reference numerals 1, 1' designate the opposing split or divided dies, which dies are of a semi-cylindrical configuration adjacent to the centers thereof and have tapered end sections 2, 2'. The dies 1, 1' are slidably mounted upon a forging block 3, being held in proper lateral alignment by guides 4, 4' formed on the top of the block 3 which engage slots 5, 5' machined in the bottom sections of dies 1, 1'.

The forging block 3 has a bottom flange 6 which is bolted to the center boss section 7 of the bed plate 8, which latter is ribbed in the usual manner. The bottom center section of the forging block 3 has an extension air cylinder 9 which may be either integral therewith or attached thereto as desired. The inside of the air cylinder has a machined bore 10 into which is fitted air piston head 11 fitted with rings or packing in the usual manner. The air cylinder 9 extends through the cored hole 12 in the base plate 8 and into a pit in the concrete foundation of the apparatus (not shown). The control of the air admitted into and exhausted from the air cylinder is through the pipe 13, and the cylinder 9 is closed by the plug 14. A piston rod 15 is connected to the piston head 11 and reciprocates freely within the hole 16 bored in the forging block 3. On the end of piston rod 15, is attached a semi-circular cradle 17 on which the heated round metal blank a is placed preparatory to causing the same to be tightly gripped on the ends by the two horizontal extrusion rams 18, 18' which serve to hold same while the dies 1, 1' are being closed. When the air pressure in cylinder 10 is released, the cradle 17 is withdrawn and will rest in a clearance position in the recessed hole 19 which is cored in the forging block 3, thus permitting the divided dies 1, 1' to close tightly around the blank a while it is resting in its proper position in the dies.

The hand wheel 20, the rotation of which serves to draw the dies 1, 1' tightly together, is rigidly mounted on the horizontal shaft 21, which is provided adjacent its ends with two pinion gears 22, 22' that mesh respectively with spur gears 23, 23' that are rigidly secured to flanged threaded nut bushings 24, 24' by means of keys 25, 25'. Said threaded bushings in turn engage with corresponding threads machined upon traverse screws 26, 26', which are securely attached to the cast boss sections 27, 27 of dies 1, 1' by taper pins 28, 28' which latter prevents the traverse screws from turning in the machined holes in the bosses 27, 27'. The traverse screws, threaded bushings, and spur gears fitted thereto are mounted within the upper section 29, 29' of flanged, heavy, ribbed pillow blocks 30, 30' which latter are fixedly attached to the bed plate 8 and held in their proper position by cap screws 31. The horizontal shaft 21 is supported in proper alignment laterally by brackets 32, 32' which are an integral part of pillow blocks 30, 30'.

When the dies 1, 1' are drawn tightly together in a position which places the vertical split faces thereof on an exact longitudinal center line through the bed plate 8 and with the horizontal rams 18, 18' on a vertical center line through the vertical ram 33, then the divided dies 1, 1' will be in a proper position to be pressure-wedged together preparatory to the extrusion pressures being applied to the forging ram. The pressure wedging rings 34, 34' are bolted to sliding cross heads 35, 35', said cross heads being slidably fitted to four longitudinal tie-rods 36.

Cross heads 35, 35' and 38, 38' each have four non-friction metal bushings 37 which have a free sliding fit on the tie-rods 36. The cross heads 35, 35' are provided with bosses or wing sections 39 in which are tightly fitted traverse rods 40 (shown in broken section in Figs. 3 and 4), the same being held in position by nuts. The traverse rods serve to effect movement of the cross heads 35, 35' independently of the ram and plunger-carrying cross heads 38, 38'. While the rapid movement of the traverse piston rods and their connected parts should preferably be accomplished by the use of steam, I do not limit my operation to this medium, as compressed air, expansive gases, or electrical power could be used to furnish the power for the traverse movement thereof.

The traverse and power cylinders and parts connected thereto, together with valve controlling mechanism, are of standard construction and are not shown in drawings.

Horizontal hydraulic plungers 42, 42', which are provided with horizontal forging ram heads 43, 43', are secured to said cross heads 38, 38'. The rams 18, 18' are either integral with heads 43, 43' or may be attached thereto as to a separate part thereof. The ram heads 43, 43' project through cross heads 35, 35' and the wedging rings 34, 34', the same being slidably guided therein by bushings 44, 44' which have a tight pressure fit in the machined holes 45, 45' of the cross heads 35, 35', said guiding means compelling the extrusion rams 18, 18' and the ram heads 43, 43', as well as the extensions 33' thereof, to travel on the exact center line of horizontal cavities 33'', 33''' of the divided dies 1, 1' with which cavities the extensions 33' have a snug sliding fit, whereby a perfect central movement is obtained which insures an accurate and uniform wall thickness of the hub members 46, 46' and at the same time said die-upsetting shoulders 47, 47' of the extensions 33' are guided in an exactly central position to form the hub flanges 48, 48' on the finished forging b.

Four vertical tie-rods 49, the lower ends of which are fitted tightly into machined holes 50 in the bed plate 8 and held securely in place by heavy nuts 51, serve as guides for the cross head 53 and also for supporting the hydraulic and draw-back cylinders (not shown) in their proper position. These nuts take the downward thrust of the extrusion ram pressures and the upward thrust of the drawback pressures. The vertical hydraulic plunger 52 is attached to vertical cross head 53, which has integral wing sections 54, 54' to which are attached two draw-back piston rods 55, 55' that are held securely in place by nuts 56. The vertical forging ram head 57 is rigidly attached to the cross head 53, the extension end of same fitting snugly but reciprocating freely within the split apertures 58, 58' or the dies 1, 1'.

The construction and operation of the modified apparatus as shown in Figs. 19 to 22 are identical with the apparatus hereinbefore illustrated, except that the heated metal blanks a and the pre-formed blank a' are manually or otherwise projected between the dies 1, 1' and upon the supporting rods 60, 60' preparatory to the lateral closing of said dies around the blank, instead of the blank being supported by pressure contact suspension between the ends of the extrusion rams 18, 18' while the dies are being closed around same as hereinbefore described.

The rods 60, 60' are located directly under the center of the valve body die cavities, and spaced at such a distance apart from each other so as to balance the blank and to prevent it from tilting out of position, one end of each of said rods being tapped into the apertures 61 machined in the inner wall face of the die 1' and each of the other ends being slidably mounted in the clearance holes 62 in the opposing die 1. As the dies 1, 1' are closed together the inner contours 63, 63' of their die cavities serve to raise the blank $a$ or $a'$ into its proper forging position. The blank $a'$ is the same as the blank $a$ in shape except it has been partly preformed by the upsetting of the metal in the center of same, in order to facilitate the action of the horizontal and vertical rams during the extrusion operation.

The divided dies 1, 1' are fitted with flash-sealing strips 64, 65 which are an integral part thereof or attached thereto by standard screws and which entirely surround the die cavities therein. The lower strip 65 extends longitudinally, from end to end, of said cavities and engages with the slot 65' in the opposing die face while the lower strip 65 has an incline top surface 66, which prevents scale or any other extraneous matter falling from the blank $a$ or $a'$ and lodging on the sealing strip which might prevent the dies 1, 1' from closing tightly together. The top sealing strips have the usual square surfaces, and both the grooves 64', 65' have the proper depth and clearance to prevent the strips from touching the bottom of the slots, thereby allowing the two faces of the dies to be freely forced tightly together. The purpose of this sealing means is to prevent the deterioration of the die faces by the erosion of same by reason of any of the metal flashes coming in contact with same during the extrusion of the metal in the dies.

The construction and operation of the modified apparatus as shown in Figs. 23 and 24 are identical with the apparatus hereinbefore illustrated, except that an additional means has been provided for guiding and inserting the billet into its proper place in the die and for quickly withdrawing the finished valve body from the position to be occupied by an incoming billet. As embodied, there is provided a pair of T bars 70, 70' which are bent into an open V-shape with the cross of the T on the under side. One end of the T bars is curled partially around upon itself, as shown at 71, at a radius substantially the same as that of the tie rods 36 while the other end is merely bent to a horizontal position as indicated at 72. The T bars are secured upon the tie rods 36 as by screws 73 and are so spaced that the distance between the stems of the T bars is slightly greater than the length of the billet which is being used. At the apex 74 of the V of the T bars 70, 70', which is directly over the center of the die, each inner flange has been cut away for a distance equal to slightly more than the diameter of the billet so that as the billet rolls or is guided down the incline formed by the T bars it will no longer be supported by them but fall through and into the receptive cradle 17. When using this form of billet-handling apparatus, it is necessary that the rod 75 upon which the cradle 17 is secured shall be longer than the corresponding rod 15, previously described, so the said cradle can be projected the full distance from the recess 19 to a point directly under the apex of the T bar guideway 70, 70'.

For withdrawing the finished valve body from the apparatus, the T bar guideway on the side opposite the feed is formed into a chute by welding or otherwise securing a heavy sheet metal apron 77 to the two inner flanges 76 of the T bars 70, 70'.

The sequence of operations for the above described feed and withdrawal apparatus is as follows: The dies being open and the cradle 17 in position beneath the apex of the T bar guideway 70, 70', the operator manually places, by means of a conveyor or otherwise, a cleaned, heated billet upon the flanges of the T bars 70, 70' whereupon it is released and rolls down the incline and comes to rest upon the cradle 17 which then is caused to quickly descend to its recess 19. In its downward movement, however, the ends of the billet, which project a considerable distance beyond the sides of the cradle, come to rest on the supporting rods 60, 60' which hold the billet in the exact position necessary to be acted upon by the dies and rams. The cradle comes to rest in its recess 19, the dies then close, the rams are actuated and the valve body is formed in the manner already described after which the dies open and the horizontal rams recede leaving the valve body frictionally secured upon the end of the vertical ram 33 which then rises to a height above the T bar guideway somewhat greater than the height of the valve body. Thereupon the cradle 17 is caused to follow the ram 33 in its upward travel to a position for receiving the next successive billet to be operated upon. When the ram 33, carrying the valve body with it, reaches its upper position, the operator knocks the valve body loose from the ram, whereupon it falls partially upon the cradle 17 and the apron 77 where it can be picked up either by a conveyor, or by tongs manually manipulated by the operator, and dragged up the incline of the chute and out of the machine. Meanwhile a new billet is being fed into the guideway 70, 70' from the other side, thus keeping the machine in continual and speedy operation.

In processing a heated metal blank into a valve body, as illustrated in Figs. 1-5 of the drawings, all of the different operations are the same whether operating on ferrous or non-ferrous metals, such as steel, iron, wrought iron, brass, or copper alloys for example, but the temperatures and pressures required to cause the metal to flow into the shape desired vary according to the character of the metal in the blank.

As an example of the preferred method of operation in the production of valves and fittings, I will now proceed to describe the manufacture of a steel valve body:

*First stage.*—A steel blank $a$, preferably cylindrical, of the same cubical content as the finished valve or fitting and of considerably less diameter than that of the cavities 33', 33'' of the dies 1, 1', is heated to the proper extrusion temperature in a furnace adjacent to the machine. The blank is quickly withdrawn from the furnace, thoroughly cleaned, and then manually or otherwise placed in a central balanced position upon the cradle 17 which has been elevated to its uppermost position between the faces of dies 1, 1' that have been separated preparatory to starting the operation (see Figs. 1, 4 and 5).

*Second stage.*—The blank a now being in the proper position to be tightly enclosed within the dies 1, 1', the two horizontal extrusion rams 18, 18' are then rapidly advanced toward the center until the ends of same contact with the ends of the blank, sufficient power being applied to the rams, through the cross-heads 38, 38' and 35, 35', to hold the blank suspended in a fixed central position in the dies between the pointed ends of the rams. The blank-gripping action is very rapid and therefore the quick moving traverse piston rods are employed for this purpose in preference to the slower movement of the hydraulic plungers. Simultaneously with the suspension of the blank between the ends of the rams, the air pressure is released in the air cylinder 9 which allows the cradle 17 to return immediately to a clearance and resting position in the recessed portion 19 of the forging block 3. The hand-wheel 20 is then rotated rapidly, either manually or by other means, thereby causing a rapid lateral movement of the traverse screws 26, 26' together with the die 1, 1' carried thereby and as a consequence the dies 1, 1' are tightly closed together around the heated blank, as well as around the horizontal ram-head extensions 33' and the vertical ram-head extension, thereby effecting a substantially air-tight closure of the heated blank within the cavities of the dies.

*Third stage.*—The heated blank now being tightly enclosed within the dies, the power is then quickly applied to the piston rods 40, whereby the said crossheads 35, 35' and rings 34, 34' carried thereby are forced into engagement with the tapered sections 2, 2' of the dies 1, 1', and the tight closure of the dies is maintained during the time the highest internal pressures are applied. The positions of the blank a, the vertical and horizontal rams, the dies, 1, 1' and the wedging rings 34, 34', at this stage of the operation, are shown diagrammatically in Fig. 14.

*Fourth stage.*—The blank a now being in forging position, the dies 1, 1' being wedged and locked tightly together and the rams 18, 18' having been advanced to contact with the ends of the blank, the apparatus is therefore ready for the actual extrusion pressures to be applied. A ram-pressure of 25,000 pounds to the square inch is then applied to the rams 18, 18' which immediately causes the plastic metal of the blank to assume the shape shown diagrammatically in Fig. 15. This pressure is applied at such a speed to cause the rams to advance at the rate of approximately one inch per second, the same being continuously applied for the first 50% of the ram's stroke at which point the blank assumes the approximate shape shown diagrammatically in Fig. 16.

*Fifth stage.*—The blank at this stage of the operation has a lower degree of plasticity than during the previous operation, due to its cooling off by longer contact with the rams and die cavities and therefore, in order to maintain a constant and uniform speed of flow of metal to form the desired shape at this stage of the operation, an increased hydraulic extrusion pressure is necessary. Accordingly the horizontal forging ram pressure is thereupon stepped-up to 30,000 pounds to the square inch. Simultaneous with the application of the horizontal ram pressures, an extrusion ram pressure of 30,000 pounds per square inch is applied to the vertical ram 33, which forces the same plastic metal as it flows upward and around same and into the upper cavities of the dies, such upward flow of the metal being the result of the continuation of the movement of the horizontal rams 18, 18' towards the center of the blank. The horizontal forging ram pressure is maintained at 30,000 pounds to the square inch until the said horizontal rams, 18, 18' have completed 80% of their stroke, while the vertical ram forging pressures is maintained at 30,000 pounds per square inch until the vertical ram 33 has completed 60% of its downward stroke. The relative positions of the horizontal and vertical rams and the approximate shape of the forging are shown diagrammatically in Fig. 17.

*Sixth stage.*—The metal blank at this stage of the operation has further cooled off, thereby possessing a correspondingly lower degree of plasticity than at the preceding stage. This sixth stage is the beginning of the last 20% of the horizontal ram's stroke and the beginning of the last 40% of the downward stroke of the vertical ram 33. It is therefore necessary to apply higher extrusion pressures in order to continue the uniform speed of flow of the metal upward around the vertical rams and to upset the ends of the blank to form the hub flanges thereon. And so consequently the extrusion ram pressure of both the vertical and horizontal rams is quickly stepped-up to 35,000 pounds to the square inch. When the horizontal rams have reached the end of their respective strokes, with the above maximum pressure applied thereto, the vertical ram will still have traveled downward only 80% of its stroke. The stroke of the horizontal ram is arrested by the shoulders on the ram heads 43, 43' contacting with the end faces of the wedging ring cross-heads 35, 35' which remain stationary in this position with the full hydraulic power pressure applied thereto, this pressure reacting upon the wedging rings to force the dies 1, 1' closer together, while the vertical ram is completing the last 20% of its stroke while still under a ram pressure of 35,000 pounds to the square inch which high pressure is essential in order to enable the ram 33 to complete its stroke and finish-form the body of the forging and upset and form the flange thereon. The downward stroke of the vertical ram 33 is likewise arrested by the shoulders of the ram-head 57 coming in contact with the top faces of the divided dies 1, 1'. The form of the finished extruded forging and the corresponding position of the horizontal and vertical rams within the dies at the end of the downward stroke of the ram 33 are shown diagrammatically in Fig. 18.

*Seventh stage.*—After the completion of the preceding operation, the hydraulic pressure on the rams is quickly released in all cylinders thereby allowing a free backward movement of the horizontal ram-carrying cross-heads 38, 38' and effecting the quick withdrawal of the horizontal rams from the finished forging so as to completely clear the end faces of the hub and top flanges thereof. The cross-heads 35, 35' and 38, 38' are then caused to recede which action releases the wedging rings 34, 34' from engagement with the tapered sections 2, 2' of the dies 1, 1'. The arresting of this backward movement is accomplished either manually, mechanically or otherwise. The relative position of all the longitudinal sliding members, except the power units, are shown in Fig. 1.

*Eighth stage.*—In the preceding operation, the dies 1, 1' having been unlocked from wedging engagement with wedging rings 34, 34', the said dies are now separated by the lateral backward movement away from each other, this movement being performed by rotating the die-traverse hand wheel 20. The dies are thus separated sufficiently to completely free themselves from the finished forging, the further backward movement thereof being arrested in any suitable manner when the dies having been properly separated, and the finished forging will then be left suspended upon the vertical ram 33 which will be at the end of its downward stroke. The ram 33 carrying the finished forging *b* is then caused to move upwardly between the dies to a point where the bottom of the forging will clear the top of divided dies in which position it can be quickly recovered by means of suitable tongs or the like. Simultaneous with this latter operation, the power is quickly applied to the cradle piston, which is projected upwards until it rests in a horizontal center position between the two halves of the divided dies ready to receive another heated blank preparatory to another cycle of operations.

The time estimated to complete the eight separately described operations, but which, by nature of their interlocking movements, are as one, is approximately but one minute and 30 seconds when processing a steel or other ferrous metal blank weighing approximately 104 pounds and when using the speed and temperatures herein specified and, obviously, a slightly longer time for a heavier blank and a shorter time for a smaller in size would be required. When producing a steel valve or fitting, the temperatures range prevailing during the entire operation is between 2350° F. and 1950° F. Higher speeds and lower temperatures are required to process metal blanks of wrought iron and non-ferrous metals.

The purpose of describing the aforesaid operations on ferrous metals in complete detail is to disclose a rapidly performed sequence of synchronized mechanical movements which are accomplished in a unitary apparatus, together with a process of flowing metal into irregular and complex shapes by the use of progressively applied high pressures to the forging rams in order to force the plastic metal into the die cavities, at all stages of which operation there is a complete balancing of the angularly applied pressures and thereby any destructive action on the physical structure of the heated metal while it is in a plastic state is prevented.

Heretofore, as I am well aware, it has been proposed, as for example in the disclosure of the Patent No. 1,445,140 to confine a drop forging within a die while the latter is contained within a die-holder and while so confined subjecting such forging to the simultaneous or alternate action of a plurality of punches or piercing tools and accordingly I make no claim broadly to any such method of procedure. However, the aforesaid patent disclosure differs radically from my invention and more particularly in that my improved apparatus permits of the employment of high forging pressures, from 25,000 to 35,000 lbs. per sq. and high temperatures, namely, about 2350° F., whereas in the aforesaid patent disclosure if it were attempted to employ such temperatures and pressures, the split dies within which the forging is confined would become jammed or frozen within the die-holder and the finished shape could not, without great difficulty, be recovered from the die, nor could the split dies be released from the die-holder until the forging and split die had both contracted sufficiently, due to the cooling thereof, to release the same and consequently the operation would be so slowed up as to be impractical for high speed production. Furthermore, if a forged steel shape is to be produced which has right angle projections or a plurality of flanges integral therewith, such as disclosed in said patent, the metal will not, when heated to an extrusion temperature, flow into the cavities which correspond to the flanges to be formed, owing to the rapid cooling of the same, with sufficient freedom to render it possible to completely fill such cavities and thereby properly form such flanges or right angle projections as a result solely of the application of the punching or piercing tool pressures to the hot metal operated upon, whereas when operating in accordance with my invention, it is unnecessary to force the metal to flow into small cavities that correspond to the contour of the desired flanges, but such flanges are formed as a result of an upsetting operation which can be accomplished after the metal has cooled off quite considerably.

The temperatures employed in operating upon different metals should be such that the metal is plastic, that is, considerably above a rolling temperature, but below the temperature at which the metal becomes viscid, i. e. the temperature at which the metal if deformed, will re-form itself as contra-distinguished from the action of plastic metal and in the case of steel, the preferred temperature is in excess of 2250° F. and not over 2400° F.

It is well recognized in the art (see in this connection "Metallurgy of Iron and Steel" by Bradley Stoughton, pp. 257, 258), that there are certain critical temperatures which it is important to observe in the finishing of wrought iron or steel and that consequently the plastic deformation of such materials under high pressures is different in nature above than it is below the critical range i. e. between 1212° F. and 1652° F., the latter temperature being the critical point for the ideal pressure finishing of 0.45 and 0.55 carbon content open-hearth carbon steel. When steel is finished above its critical temperature aforesaid, the deformed structure is prevented from thereafter re-arranging itself into a normal crystalline structure and below the critical temperature the crystals of the crystalline steel structure are distorted and broken up and do not thereafter re-form themselves. Accordingly by finishing the operation on steel at or near the critical range and while the metal is somewhat plastic, as may be accomplished when operating in accordance with my invention, a less drastic effect is produced on the crystalline structure than were the finish working of the metal performed at a temperature lower than the critical temperature aforesaid which would result in prolonged or repeated deformations of the structure that would deleteriously affect the ductility and malleability thereof. This control of these temperatures during the finish working operation when operating in accordance with my invention may be effectively accomplished, particularly since because due to the speed of operation the metal shape while being finished can be prevented from falling below the aforesaid critical temperature and at the same time such speed of operation can be so regulated as to insure that the metal will be within the critical temperature range during the finish working operation.

Another advantage flowing from my invention is that in general an extruding operation is well recognized as producing a far better crystalline structure of the metal operated upon and a thorough working of the metal at much greater depths, besides affording a far better control of the temperature of the metal up to the time that the operation is completed than is possible to obtain when resorting to a rolling operation. Moreover, when an intricate shape is to be produced, a rolling operation, performed at the usual rolling temperature, is far more likely to tear the metal than would be the case were the same extruded, because at the point where the rolls are deeply cut, the marginal velocity thereof is much greater than that of the bottom of the cut portions and thus there is a tendency for the metal to be dragged through the rolls at different speeds, which action deleteriously affects the crystalline structure of the metal.

My improved apparatus renders it possible to expeditiously conduct the various stages of the operation therein prior to the excessive cooling of the metal and at the same time to recover the finished shape without in any way delaying the next successive operation and consequently my invention, particularly when the feeding and delivering mechanism shown in Figs. 23 and 24 are employed, is peculiarly adapted for high speed production.

This invention is also peculiarly adapted for the production of long body valves with relation to the length of their fluid ways, such as screwed-end drilling valves having but a single terminal top flange, in which event the elongated blank would be inserted into the dies in a vertical position and only the vertical ram would be provided with a flange-upsetting shoulder and the same would, in conjunction with the bottom of the dies by its initial movement cause the formation of the valve chamber and also of an expanded or swollen portion or boss adjacent the bottom thereof which expanded portion would be subsequently pierced by the lateral rams to form the abbreviated hubs and fluid ways of such long body drilling valve.

The term "flange" as used in the claims denotes a coupling flange which is of sufficient area to admit of the same being drilled for the reception of bolts customarily used in coupling flanges of valves and the like in high pressure steam, oil and other fluid conveying lines.

Various changes from the construction and method of operation herein disclosed may be made without departing from the spirit of my invention as embraced within certain of the appended claims.

Having thus described my invention, what I claim and desire to obtain by United States Letters Patent is:

1. In an extrusion apparatus for making multi-way shapes, the combination comprising two opposing aligned slidable, die members, having cavities of a predetermined shape therein, opposing aligned slidable, die-wedging means adapted to reciprocate at right angles to the path of reciprocation of said die members, a plurality of forming-rams so mounted as to be capable of projecting into the respective cavities of the die members, certain of said rams also projecting through and being in slidable engagement with the die-wedging means, means for closing the die members together, and means for causing said die-wedging means to embrace said die members and securely hold the same in a closed position during the extrusion operation, and means for projecting certain of said rams simultaneously into the die cavities and for projecting another of said rams into the die cavities following the partial projection of the first mentioned rams into the die cavities.

2. In an extrusion apparatus for making multi-way shapes, the combination comprising two opposing, aligned, slidable die members, having cavities of a predetermined shape therein, opposing, aligned, slidable, die-wedging means adapted to reciprocate at right angles to the path of reciprocation of said die members, a plurality of forming-rams so mounted as to be capable of projecting into the respective cavities of the die members, certain of said rams also projecting through and being in slidable engagement with the die-wedging means, means for closing the die members together, means for causing said die-wedging means to embrace said die members and securely hold the same in a closed position during the extrusion operations, means for projecting certain of rams simultaneously into the die cavities and for projecting another of said rams into the die cavities following the partial projection of the first mentioned rams into the die cavities and means for feeding a blank into the apparatus while the blank is held in an aligned position and means for receiving and holding such blank in a predetermined aligned position pending the initial movement of such rams.

3. In an extrusion apparatus for making multi-way shapes, the combination comprising two opposing, aligned slidable, die members having cavities of a predetermined shape therein, each of said die members having tapered outer ends, opposing, co-operating die-wedging members, each of said members having tapered recesses conforming in size and shape to the tapered end of an adjacent die member and forming rams adapted to project into the cavities in said dies, certain of said forming-rams being arranged to project into the dies at a different time from that at which another of said forming-rams projects into said dies.

4. In an extrusion apparatus for making multi-way shapes, the combination comprising two opposing, aligned slidable, die members having cavities of a predetermined shape therein, each of said die members having tapered outer ends, opposing co-operating die-wedging members, each of said members having tapered recesses conforming in size and shape to the tapered end of an adjacent die member, forming-rams adapted to project into the cavities in said dies, and a cradle member for temporarily supporting a blank between said die members pending the initial movement of the rams to a position where the same contact with the ends of said blank.

5. In an extrusion apparatus for making multi-ways shapes, the combination comprising two opposing, aligned slidable, die members having cavities of a predetermined shape therein, each of said die members having tapered outer ends, opposing co-operating die-wedging members, each of said members having tapered recesses conforming in size and shape to the tapered end of an adjacent die member, forming-rams adapted to project into the cavities in said dies, a cradle member for temporarily supporting a blank between said die members pending the initial movement of the rams to a position where the same contact with the ends of said blank, means for effecting in sequence the movement of a blank while held on said cradle into an aligned position between said rams, the movement of certain of the rams into contact with the terminals of said blank, the withdrawal of said cradle from between the dies, the closure of the dies, the wedging of said dies together, the extrusion of the metal in portions of said blank by said rams and the subsequent upsetting of portions of the metal so extruded to form terminal flanges.

6. In an apparatus for making extruded shapes, the sub-combination comprising opposing slidable die-members, opposing die-wedging members arranged to reciprocate transversely with respect to the path of travel of said dies and means for effecting successively the closing together of the die members and the wedging together of the closed die members.

7. In an apparatus for making extruded shapes, the sub-combination comprising opposing slidable die-members, opposing die-wedging members arranged to reciprocate transversely with respect to the path of travel of said dies, means for effecting successively the closing together of the die members and the wedging together of the closed die members and a plurality of forming-rams, two of said rams being arranged to reciprocate while their axes lie in the same plane and at least one of said rams being arranged to reciprocate with its axis in a plane at an angle to the axes of the other rams, said forming-rams being provided with flange-upsetting means.

8. In the method of extruding multi-way metal shapes, the steps which comprise simultaneously piercing at opposite ends thereof an elongated blank of a cubical content substantially that of the shape desired and while heated to an extrusion temperature, allowing said blank to freely expand centrally thereof during such piercing operation until sufficient metal has gathered to allow of the formation by a subsequent operation of an offset chambered portion of the shape desired, piercing such gathered portion and then in the same heat upsetting terminal flanges on the respective pierced portions of the blank.

STANLEY W. SPARKS.